(12) United States Patent  (10) Patent No.: US 7,707,251 B2
Birch  (45) Date of Patent: Apr. 27, 2010

(54) DRAWING TOOL USED WITH SOCIAL NETWORK COMPUTER SYSTEMS

(75) Inventor: Michael Birch, San Francisco, CA (US)

(73) Assignee: Bebo, Inc., San Francisco, CA (US)

( * ) Notice: Subject to any disclaimer, the term of this patent is extended or adjusted under 35 U.S.C. 154(b) by 455 days.

(21) Appl. No.: 11/487,039

(22) Filed: Jul. 14, 2006

(65) Prior Publication Data

US 2007/0016689 A1    Jan. 18, 2007

Related U.S. Application Data

(60) Provisional application No. 60/699,296, filed on Jul. 14, 2005.

(51) Int. Cl.
*G06F 15/16* (2006.01)
(52) U.S. Cl. ............... 709/205; 709/203; 709/219
(58) Field of Classification Search ........... 709/201, 709/203, 217–219, 204, 205
See application file for complete search history.

(56) References Cited

U.S. PATENT DOCUMENTS

| | | | |
|---|---|---|---|
| 5,940,082 A * | 8/1999 | Brinegar et al. ............. | 345/442 |
| 6,763,373 B2 * | 7/2004 | Shiigi ......................... | 709/219 |
| 6,901,448 B2 * | 5/2005 | Zhu et al. ................... | 709/223 |
| 6,988,138 B1 * | 1/2006 | Alcorn et al. ............... | 709/204 |
| 6,992,685 B2 * | 1/2006 | Hallbauer et al. ........... | 345/619 |
| 7,043,529 B1 * | 5/2006 | Simonoff ..................... | 709/205 |
| 7,360,164 B2 * | 4/2008 | Bjoernsen et al. ........... | 709/205 |
| 2003/0095113 A1 * | 5/2003 | Ma et al. ..................... | 345/175 |
| 2003/0163525 A1 * | 8/2003 | Hendriks et al. ............ | 709/204 |
| 2004/0158495 A1 * | 8/2004 | Gennaro et al. ............. | 705/23 |
| 2006/0089820 A1 * | 4/2006 | Yu et al. ..................... | 702/186 |

* cited by examiner

*Primary Examiner*—Philip B Tran
(74) *Attorney, Agent, or Firm*—Dergosits & Noah LLP

(57) ABSTRACT

A social network drawing system allows users of the social network to communicate with text as well as pictures that are posted on a web site. The social network program includes a user interface having drawing tools and a drawing area. The user selects the desired tools which include a marker, marker color, marker size and canvas size to prepare the illustration using a computer mouse. The completed illustrations are posted on the posting page which allows other users to view and respond with additional illustrations to the posted drawings.

20 Claims, 9 Drawing Sheets

Stanford

View All Friends | Invite More Friends

Contact Details
   Email Home mjb@abc.com
   Email Work mjb@abc.ac.uk
   Email Other fred@something.edu
   Phone Home 123-456-7890
   Phone Work 098-765-4321
   Phone Mobile 102-934-8576
   Birthday September 1st 1962

Home Address
   123 Abc St., SFO, CA

Work Address
   987 Zyx St. OFS, AC

Photos

View All | Upload

Blog
Tsfasdfsf
Asdasdasd     2 days ago 1 comment     15 days ago 0 comments     17 days ago View All | Write To My Blog Quizzes
                     1 Taken
View All | Create a Quiz Watched By     Watching
                     No one.

FIG. 4

DRAWING TOOL USED WITH SOCIAL NETWORK COMPUTER SYSTEMS

CROSS REFERENCE TO RELATED APPLICATIONS

This application claims priority under 35 U.S.C. §119(e) to U.S. Provisional Application Ser. No. 60/699,296 "Drawing Tool Used With Social Network Computer Systems" filed Jul. 14, 2006 which is hereby incorporated by reference.

BACKGROUND

Many computer drawing programs are currently available. These drawing programs vary in complexity from simple artistic computer painting programs to very complex computer aided drafting programs. The drawing programs provide a set of drawing tools such as lines, shapes, line width, color fill, pattern fill and erase. The user can manipulate a cursor on a screen and click on the desired tool. The marker tool with a thin tip may simulate a pen or pencil drawing while a marker with a winder point may be used to simulate a brush stroke. With the drawing tools, the user can move the mouse to control the movement of the marker and simulate the release of ink by depressing the left mouse button to create lines displayed on the screen. The user can paint an image and then edit the image on a computer screen. The drawings can be made from many lines in many different colors, widths and shapes. Once the drawings are finished, they can be saved in various formats.

Existing internet applications include: e-mail, forums, instant messenger, blogs, and social networks. These internet applications allow users to log on and input text that is sent to others or viewable on a website. Some forums such as auction or on-line classified sales web sites allow saved pictures to be posted with text or attached as files or links. The pictures are typically created with a digital camera which are saved and downloaded to the internet web site. Some communications network programs allow for limited pre-drawn illustrations to be input into text. These illustrations are built into the application and are typically obtained by typing a specific group of text symbols such as the combination of ":" and ")" to create a happy face illustration. Other writing programs allow a limited number of symbols to be input into the text document. When desired, the user can access a symbol menu that includes a set or multiple sets of predefined symbols some of which may be very basic illustrations. A user can select the desired illustration for insertion into the text. Because these illustrations are predefined, they are not original works created by the user.

While the drawings or paintings produced by drawing programs can be saved and posted on social network websites with text, these communications programs do not provide any integrated drawing tools that allow users to create and post artistic works on a social network webpage. What is needed is a social network system that has integrated drawing capabilities.

SUMMARY OF THE INVENTION

The present invention is a flash based application program that is used to create, transmit and post drawings that is incorporated into network communications programs. The inventive drawing program can be incorporated into various internet communications programs such as web browsers, instant messenger, social networks, blogs and other internet or network based communications programs. This combination of features allows users to simultaneously create both illustrations and text documents and immediately post both in a single document that can be viewed by all other users who are logged onto the social network system. Traditional communications programs allow users to write and send text messages to each other, but do not allow the user to spontaneously include a drawing using tools that are built into the communications application.

The present invention uses a server to run a social network program that includes social network web pages used by each user to prepare illustrations and text messages as well as pages for posting the illustrations and text messages that can be viewed by some or all of the social network users. In an embodiment, the drawing preparation page may be viewed as the illustration is being created by other members of the social network. A user may access the social network using a web browser that addresses the URL for the social network. The user may be able to view the postings that may be arranged according to various categories such as subject (news, music, travel, arts, etc.), friends, family, classmates, work associates, etc. The system may require the user to register and log onto the social network before the user will be allowed to post text and illustration messages.

Once registered, the user can go to the drawing page which may include a drawing area and a drawing tool area. The drawing area may have a graphical representation of various drawing tools. The user can use a pointing device such as a mouse to select the drawing tool as well as the color output for the tool. For example, the left side of the drawing page may have tools including: a drawing point diameter control, a drawing color palette and a background color palette. The right side of a drawing page may have a drawing area in which the drawing tool is used to create the illustrations. The user may select the background color, drawing color and marker diameter and then move the marker point to the drawing area. By clicking on the mouse button and moving the mouse, the user can create illustrations. If the user makes a mistake, the "UNDO" button can be used to undo the last action which may be a mark. If the user wishes to clear the illustration entirely and possibly start the illustration over again, he or she can click on a "CLEAR" button that erases all marks formed in the drawing area. When the illustration is completed, the user can click on a button which may be labeled "DONE" that posts the drawing on the post page.

Although the simplicity of the inventive drawing system may be very appealing for the majority of application, the inventive drawing program can also include additional features and/or controls. For example, the drawing program may include additional shapes, animations, straight lines, etc. In other embodiments, the system may allow multiple users to view and work on an illustration simultaneously by showing the same drawing area to multiple users. This feature would allow an illustration be created collaboratively.

In addition to posting the illustrations on a social network web site, the original illustrations may also be used for other purposes such as social games. In an embodiment, the system may be configured to allow multiple users to play a computer pictionary game. The server may transmit a secret word or phrase to one of the users who must then draw the word. Other users type in their guesses which may be shown to others or concealed. If the proper word is detected, a winner is announced by the computer and the system may provide a new word to another user. Various other games may be drawing games may be played.

The drawing program may have a feature that allows a user to produce an illustration that is sent to a recipient at a designated day and time. In this embodiment, the user selects the date and time for sending the illustration and the system will transmit the original work to the designated recipient as instructed.

The drawing program may have a feature that allows multiple illustrations to be posted sequentially in a single area of the posting site to create animation or multiple illustration messages. Program may allow the time between illustrations to be controlled. The drawing program may allow multiple users to play a "Pictionary" type game in which one player draws an illustration of a word while the other players try to guess what the figure is.

BRIEF DESCRIPTIONS OF THE DRAWINGS

FIG. 4 illustrates a member information page;

DETAILED DESCRIPTION

Figure 1:
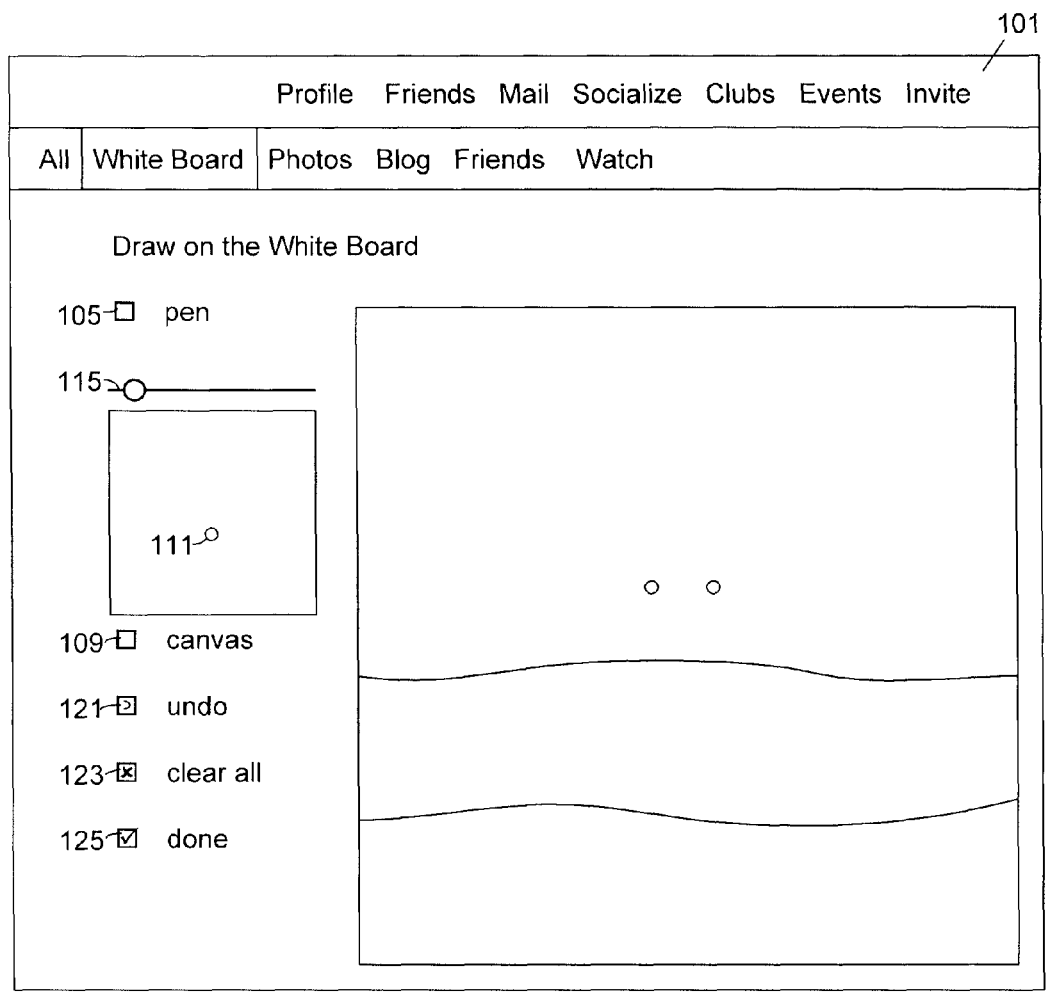
FIG. 1 illustrates an embodiment of a user interface for the drawing tool.

The present invention is an internet based social network drawing system that allows users to create pictures and communicate with illustrations as well as text. These pictures and text messages can be posted on a website, an internet forum, transmitted as e-mail messages or used within various other internet websites.

The present invention is a drawing tool that is a flash based application that can be used with social networks, web browsers, e-mail and other web based programs to create, transmit and post drawings. The drawing tool allows the user to draw pictures using their mouse and a browser program. In an embodiment, the internet application includes the drawing tools while in other embodiments, the drawing tools are downloaded from a server computer coupled to the internet.

With reference to FIG. 1, a screen shot of an embodiment of the drawing tool graphical user interface 101 is shown. The user can control the color of the pen, the size of the pen tip and the background canvas color. By clicking the mouse cursor on the "Pen" function 105, a grid of colors is displayed. The user can move the mouse cursor over the desired color and click the mouse to select the desired pen color. In other embodiments, the user may click on the pen function 105 to display the color options, move the cursor over the desired color and release the mouse button to select the desired color.

Similarly, by clicking the mouse cursor on the "canvas" function 109, a grid of possible background colors is displayed. Clicking on a specific color changes the background of the canvas to the desired color. The pen size is displayed as a circle 111. The pen size 111 is controlled by sliding the control button 115 with the mouse. The user clicks on the button and slides the button 115 until the desired pen size 111 is reached. The user releases the button 115 to select the desired pen size 111. The user can also select the marker color in the same way that the canvas color is selected.

Once the color and pen tip size are selected, the user can bring the pen to the board and draw by moving the mouse while holding the mouse button down. The user can change the color and pen size while drawing so that the lines of the illustrations will be different in appearance. It is contemplated that various other methods may be used to select a marker or canvas color and control the drawing tools. For example, the color may be selected from a pull down menu or via keyboard inputs. The movement of the marker on the drawing area may be controlled with other pointing devices such as trackballs, digitizer pads, etc.

The drawing tool also includes other editing features. The "Undo" 121 command removes the last change to the drawing. The "Clear All" 123 command removes all marks from the drawing so the canvas is clear. In the example, the user has created a picture that includes seven horizontal stripes of colors and a face composed of several smaller dots. When the drawing is complete, the user clicks on the "done" button 125 and the picture is saved as a GIF image or any other graphical file format. Although, only a few of the drawing program features are disclosed, it is contemplated that many other drawing features may be integrated into the inventive system.

In the described system separate web pages are used for preparing the drawings and posting the drawings. In other embodiments, the user can select the display format of the drawing and posting pages and may combine various features into a single web page. By being able to see other postings while creating an illustration, the user can respond more immediately to other postings. The appeal of instant message type systems is that they provide immediate interaction between users. By combining the drawing and posting features into a single page, the user can have an immediate response that is identical to an instant messenger system.

In other embodiments, the multiple users who are each logged onto the social network can simultaneously work on a single illustration. In this embodiment, one user may invite one or more other users to participate in a collaboration illustration. If the other users accept the invitation, all users will view the same drawing area and be able to add markings to the collaboration illustration. The illustration page is modified by both users so all markings are immediately shown as they are being made. The system may also allow for instant messenger and/or voice over internet so that the users can communication by text or voice as they prepare the illustration.

The present invention is used in various different applications including internet forums e-mail and other internet based application programs. Additional details of these applications will be discussed below. Early Internet forums could be described as a web version of a newsgroup or electronic mailing list; allowing people to post text messages and comment on other messages. Later developments emulated the different newsgroups or individual lists, providing more than one forum, dedicated to a particular topic. Software is used to create internet forums that run on server computers connected to the internet. Most forum software allows more than one forum to be created. These forums are containers for "threads" started by the community. Depending on the permissions of community members as defined by the board's administrator, they can post replies to existing threads and start new threads as they wish.

The inventive system allows the user to log onto a forum through the user's internet browser program and use the drawing program within the forum to post drawings as well as text. When the drawing and text are completed the drawing tool transmits the text and drawings files to the server computer. The forum program on the server receives the drawing and text files and posts the information. The information is displayed in a specific format and layout that are controlled by the web site designer. In an alternative embodiment, the postings may be screened by an administrator or a screening application before posted to prevent the publication of appropriate text or illustrations. If the drawings are screened by administrators, they may be blocked from posting or modified to omit offensive illustrations. The level of screening may depend upon the audience. Web pages for small children will have a much lower standard for offensiveness than a web page for adults. If a machine performs an automated screening process, it may scan the illustration and compare certain features of the illustration to a set of predefined offensive shapes such as swastikas, gang symbols, etc. In an embodiment, these set of offensive shapes are stored in a database memory. When the illustration is scanned, an image of each line or shape in the illustration is compared to the database of offensive illustrations. If there is a match or a similarly between the illustration and the offensive shape, the system can transmit an error response to the user or simply block the illustration from being posted. The poster can revise the drawing to remove the offensive illustration or post a new drawing.

In yet another embodiment, the drawing tool may include format controls that allow the user to control the layout and content of the posted text and drawings of the user's graphical user interface. The text and illustrations may be placed in the same drawing area and saved in a GIF image or any other graphical file format.

Figure 2:
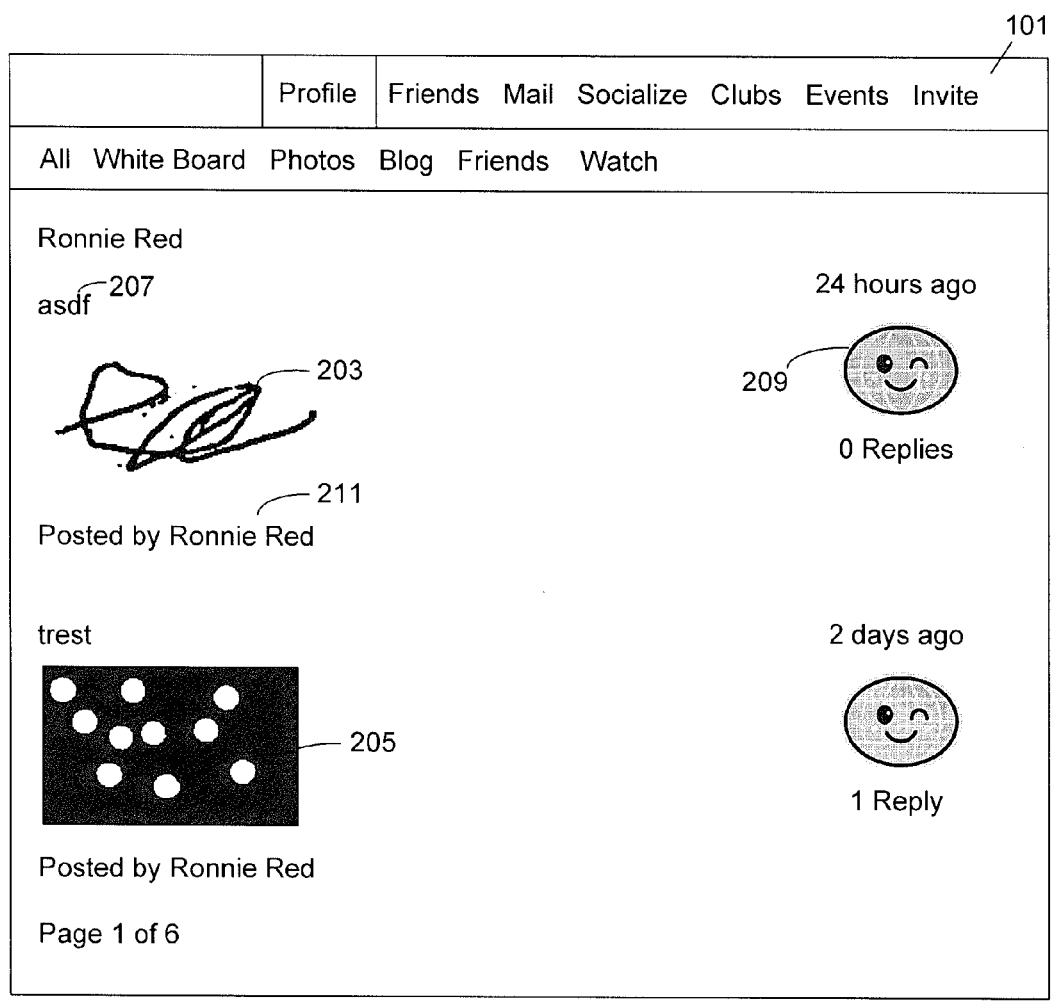
FIGS. 2 and 3 illustrate posting screen for drawings.

The server posts the picture on the web site and may also post additional information including: the author, date of creation, replies to the posting, and any other information that the web page designer wishes to include. With reference to FIG. 2, a web page with pictures created using the inventive drawing system is shown. The drawings 203, 205 are posted on the left side of the page. This is one of a plurality of web pages with drawing postings. In this example, the title 207 is displayed above the picture and the author or poster name 211 is displayed below the picture on the left side of the screen. The right side of the screen includes a picture 209 associated with the poster. There is also information regarding the time that the drawing was posted and replies to the drawing. For example, the second drawing displayed is of light dots on a dark background. The title of the drawing is "trest" and the drawing was posted by Ronnie Red. The drawing was posted 2 days ago and there is one reply to the drawing. By clicking on the reply, a user can view the reply. The layout of the web page is controlled by the server and can be rearranged to suit the needs of the service provider.

Figure 3:
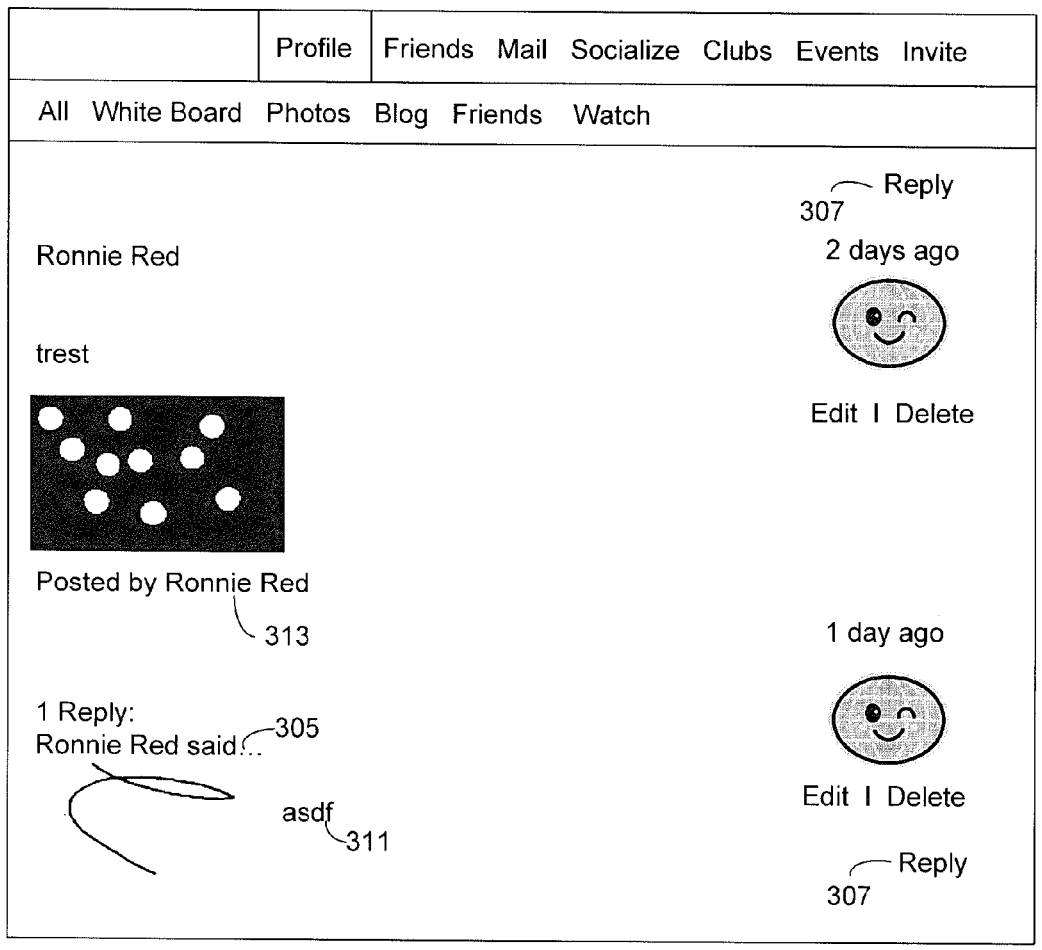

Within the forum the user can go to the desired thread and post both text and pictures. The pictures are displayed in full detail on the forum for all users to see. Other users can respond to the drawing with other drawings which are also displayed on the forum thread. With reference to FIG. 3, the server displays the replies 305 and comments to the drawing/text posting when the user clicks on the reply button 307. In this example, the reply 305 is another drawing 309 of a curved line and the text message "asdf" 311 were posted 1 day ago. Additional replies can be posted by clicking on the "Reply" button 307. By clicking on the poster's name 313, the poster's personal profile can be viewed.

With reference to FIG. 4, the poster's personal profile can include the poster's name, personal interests such as sports, music drinks, films, etc. The personal information may also include on line status, gender, age, hometown, student status, major, minor, residence, clubs, events, friends, contact information, phone numbers and addresses.

The inventive system has various other features including an internal mail system which allows communications between individual members rather than through postings that can be viewed by the entire community. In an embodiment, a member can access the internal e-mail by viewing another member's profile and the clicking on a 'send a message' button. By clicking on this button, the drawing/text tool is opened and the member can draw and/or write a message as described above. This message is only sent to the intended recipients and is not posted.

The system also allows members to block communications from other members. In an embodiment, the user can simply go to a member's profile and click on a "block" button. A blocked member cannot send e-mail to the blocking member and the blocked members posts may not be viewed by the blocking member. The member can be unblocked at any time by unclicking the "block" button on the member's profile.

The success of a social network relies upon member interest and a large membership base. Most social networks grow by invitations to others to join the network. The inventive drawing tool can be used to create personalized invitations that demonstrate the unique functionality of the inventive social network system. One method for growing the network is to use the drawing tool to create invitations for new friends to join the social network. This new kind of personalized social network invite includes the drawing in the actual invitation email. By opening the e-mail and clicking on the acceptance button, the web browser is directed to a landing page when the new member can obtain additional information about the social network and click through a new member form to join.

There are significant differences between the inventive drawing system and the prior art text based internet forums. Existing internet forums are text based and do not allow anything other than text messaging. In contrast, the inventive drawing forum allows users to view the entire drawing works without having to save and attach the drawing files. Although some internet forums allow for the attachment of files or links to picture files, these pictures are not configured to inherently display picture files. The form shown in the figures is a single example of how the inventive drawing system can be used. It is contemplated that the present invention can be applied to various other types of internet forums.

The description of the drawing tool used with the social network is one system that is compatible with the invention. The drawing tool can be integrated into many other internet network systems. For example, instant messaging systems. An instant messaging application or client allows one to communicate with another person over a network in relative privacy. Popular clients include ICQ, Yahoo Messenger, MSN Messenger and AOL Instant Messenger. One can add friends to a contact list or buddy list, by entering their email address or messenger ID. If they are online, their name will be listed as available for chat. Clicking on their name will activate a chat window with space to write to the other person, as well as read their reply. In an embodiment the drawing tool can be integrated into this program to allow drawings to be transmitted between users. In an embodiment, the system will provide drawing and text features while displaying the communications for all users in the chat group.

Internet Relay Chat (IRC) clients allow users to join chat rooms and communicate with many people at once, publicly. Users may join a pre-existing chat room or create a chat room about any topic. Once inside, you may type messages that everyone else in the room can read, as well as respond to messages from others. Often there is a steady stream of people entering and leaving. Whether you are in another person's chat room, or one you've created yourself, you are generally free to invite others online to join you. When others accept the invitation, they are taken to the room containing the other members, similar to the way conference calling works with phones. This facilitates both one-to-one and many-tomany interaction. In an embodiment the drawing tool can be integrated into this program to allow users to transmit drawing messages to one or to many.

Figure 5:
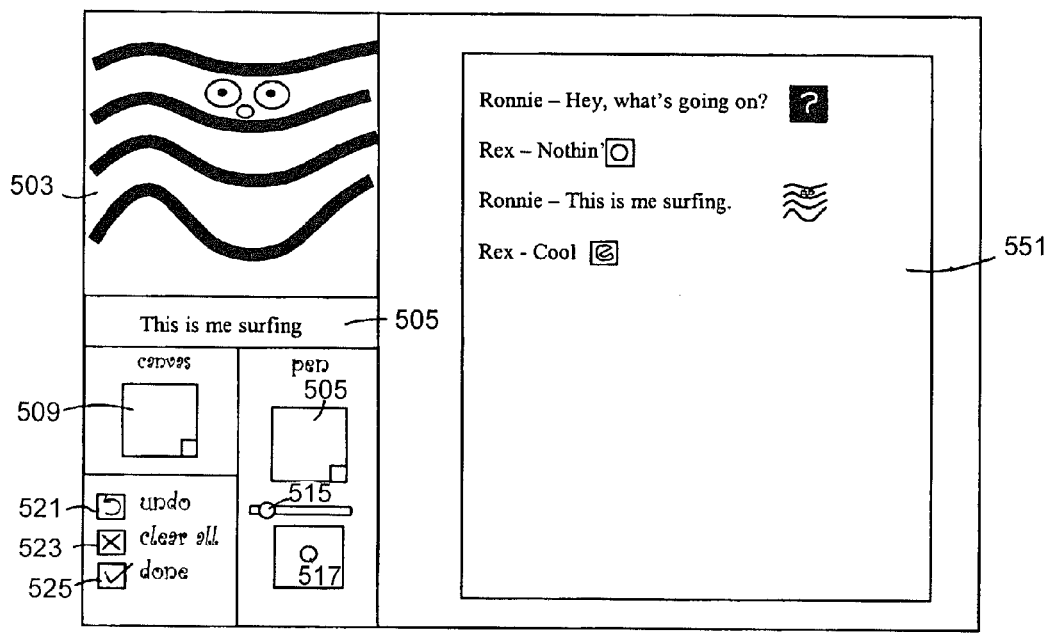
FIG. 5 illustrates the drawing tool used with a text messenger system.

With reference to FIG. 5, the inventive drawing system is illustrated in use with an instant messenger system. In this embodiment, the web page includes a drawing area 503, a text area 505, and drawing tools: canvas color 509, pen color 505, a slide button 515, pen size 517, undo 521, clear all 523 and done 525. In order to keep track of the communications a dialog screen 551 is also displayed. The dialog screen allows text and illustrations to be displayed in a sequential conversational manner. In this example, Ronnie states "Hey, what's going on?" and includes an illustration of a question mark with a black canvas. Rex responds by stating "Nothing" with a circular illustration. The conversation continues with Ronnie's text "This is me surfing" and drawing an illustration of a face in a group of curved lines and Rex replies with "Cool." In this embodiment, the drawings are shrunk in size to fit into the text format. Either user can click on any of the posted drawings for an enlargement to view the details of the work. In other embodiments, the illustrations may be larger in the post area.

Figure 6:
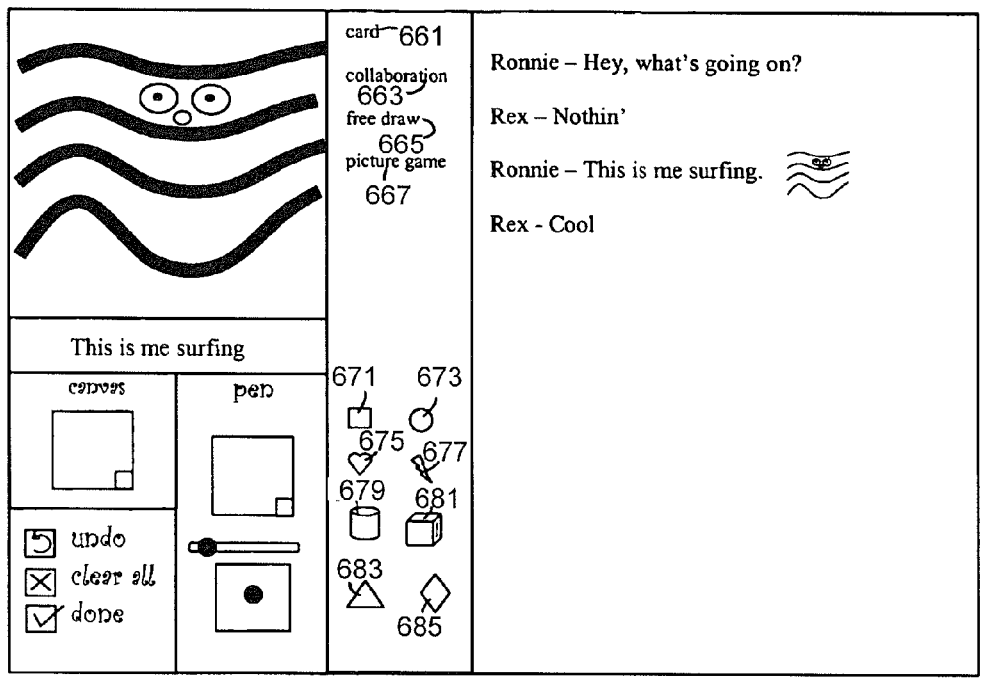
FIG. 6 illustrates the drawing tool with additional features.

Although the inventive drawing system is intended to be simple in nature, it is possible to add additional drawing functions and features. In other embodiments, the user can configure the inventive drawing system so that it simultaneously displays drawing tools, drawing area and a posting area. In this embodiment, the user can post while drawing so that other members can view the drawing as it is being created or post after completion. This configuration may also allow for increased interaction. With reference to FIG. 6, various other features can be integrated into the inventive drawing system. Examples, of features includes: card 661, collaboration 663, free draw 665 and picture game 667. In an embodiment, the card 661 feature allows a user to create an electronic card that can be sent to a recipient through the inventive system or through other communications routes such as e-mail. The collaboration 663 allows feature allows multiple users to work on a drawing simultaneously. The free draw 665 feature allows the user to work on drawings without the social network. The picture game 667 allows multiple users to participate in a drawing game in which a drawer creates an illustration while other players guess what the illustration is. In addition to features, this example also has a variety of additional drawing tools including: square 671, circle 673, heart 675, lightning 677, cylinder 679, cube 681, triangle 683 and diamond 685. In an embodiment, these additional drawing features and tools may be hidden from view in the graphical user interface.

Figure 7:
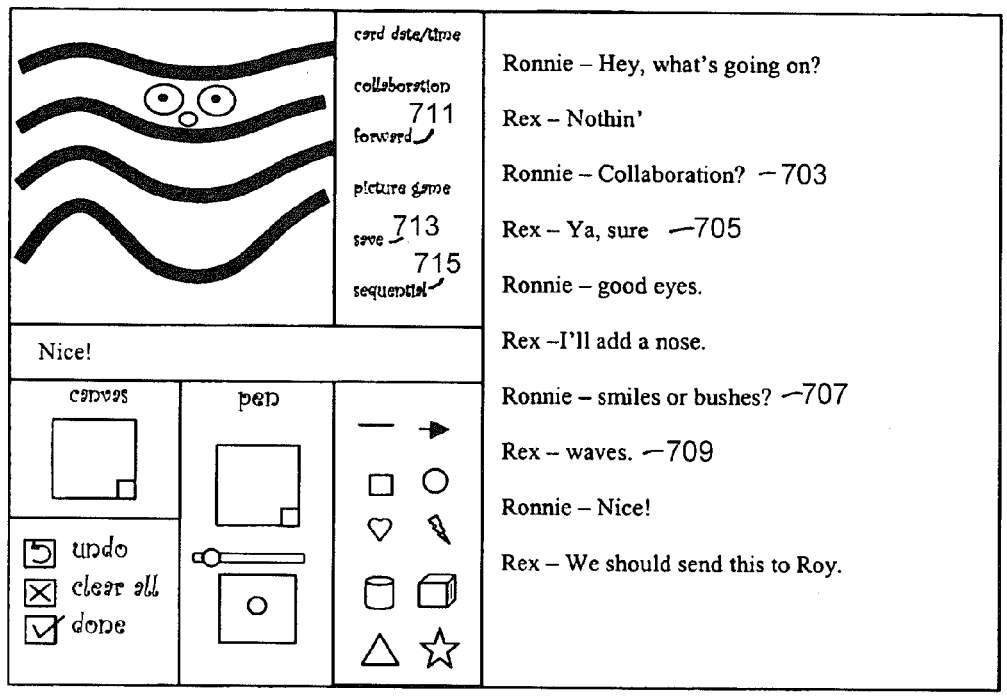
FIG. 7 illustrates the drawing tool used in a collaborative mode.

The collaboration feature is described in more detail with reference to FIG. 7, the users Ronnie and Rex decide to collaborate on a drawing. Ronnie asks Rex if he would be interested in collaboration 703 and Rex accepts 705. While both participants can work on the drawing Rex draws eyes and nose. Rex may add some curved lines and Ronnie asks if they are smiles or busehs 707. Rex replies that they are waves 709. Because all users can see the work in progress there is no need to display the work in the message posting area. In an embodiment, the users can forward the illustration using the forward command 711. Another feature is the ability to save 713 and create multiple sequential related images An Internet forum is a web application which communications between users who are logged onto a forum web site. Other users can view the topic and post their own comments in a linear fashion, one after the other. Topic are usually displayed according to the time of the last post. Because web forums are text based, they may have limited space for each posting which may be horizontal in format. New posts appear under or over the older posts. In some cases the posts are indented to show a sequence of posts. Therefore, more recent posts, or "threads," and the ones with the most recent replies appear at the top of the list. Forums can contain many different categories in a hierarchy according to topics and subtopics. For example, a general topic may be Music and subcategories may be different genres, artists, albums, songs, composers, year, etc. Examples include ezboard.com, freerepublic.com.

The inventive drawing tool can be used with internet forums to allows users to add drawings to their posts. Because space is limited, the completed illustrations may be reduced in size so that it will fit in the space but details of the illustration are still be viewable. The posting may provide an enlargement feature wherein if the reduced illustration is click on or otherwise selected, the illustration will be enlarged for enhanced viewing. The enlarged illustration may allow the threads to be viewed in the back ground or on other portions of the display.

Blogs, short for web logs, are like online journals for a particular person. The owner will post a message periodically allowing others to comment. Blogs can range from online journals to easily updated personal website. Some blogs also allow comments on the entries in a discussion forum. Some blogrolls which are links to other blogs which the owner reads. Blogs may have a trackback feature which allows one blog to notify another blog, creating an inter-blog conversation. Blogs engage readers and build a virtual community around a particular person or interest.

The blog experience can be enhanced by integrating the drawing tool invention. Examples include Slashdot, LiveJournal, BlogSpot. In these embodiments, the blog poster can post writings in combination with illustrations which can be viewed by fans, friends and family members. These blog viewers can respond to blogs by sending text and illustration messages. In this embodiment, when a user views the blog it may have a feedback or message link. By clicking of the link, the computer is directed to a drawing page having a text input, a drawing tool and a drawing space. The user can create text messages as well as creating illustrations. After completion, these messages can be directed just to the blogger or posted as a message in the comments section of the blog. In other embodiments, the system may allow the blogger to review the comments and the selectively post the comments on the blog.

Real time social networks are a hybrid of the web-based social networks and instant messaging technologies. Some examples of this include Imeem, which allows users to share blogs, files and instant messages, which creates a social network dynamically, in realtime, depending on where the user is currently located. Like the web forum, the inventive drawing tool can be integrated into the real time social networks.

Virtual worlds and massively shared online games are places where it is possible to meet and interact with some other human in an virtual world which usually looks like the reality. Some popular applications are Second Life, The Sims Online, and There. A free software and open-source initiative that may also incorporate the inventive drawing system is Solipsis. In each of these social network embodiments, the users may be able to communicate with other users by text or additionally by illustrations created with the inventive drawing system. In addition to the text message input box, the user interface includes one or more of the drawing tools described above.

In addition to systems intended to be used by many members, the inventive drawing tool system can also be used with other well known computer communications systems. In another embodiment, the present invention can be integrated into e-mail program to create e-mail documents that include drawings together with text messages. In this embodiment, the drawing tool can be added to the program through a plug in which alters the e-mail program by adding a drawing tool bar to the program. As described above, the user can compose an e-mail by using the drawing tool as well as the normal text functions of the program. Once the drawing and message are created, the message can be transmitted like a normal e-mail. The recipient can then open the e-mail and view the drawing within the received e-mail document without having to open picture with a separate program. This is an improvement over existing e-mail systems that require the user to create a picture and attach the picture to the e-mail message and then open the e-mail and open the picture document with a different drawing program. The inventive system is much more efficient because it does not require multiple computer programs to view the drawings.

The inventive drawing system can also be used with internet based electronic invitation systems. These systems like "e-vite" are used to invite and obtain RSVPs for events through a single web site. The invitees can post messages to the host. In this embodiment, the host can use the tool to draw personalized invitations. The personalization invitations will be very distinctive visually from the normal text based electronic invitations. This unique look will help to persuade more people to click through and attend the event or join the service. When the invitees receive the electronic invitation, they can click on a link in the e-mail which produces an invitation response page. The invitees can respond by accepting, declining or non-committal. In addition to the response, the invitees can also write comments and draw illustrations in the responses. The response page includes a text message space, a drawing tool and a drawing space.

Various web sites such as Friendster, Myspace, Linked In and other web sites have testimonial sections that allow the user to discuss products and/or services. These testimonial sections are all text based. The present invention can be used to allow user to draw a testimonial for a friend in addition to writing something. Testimonials would appear on friends' profiles. In this embodiment, the drawing tool may be used to create illustrations that are directly related to the subject matter. For example, if topic of conversation is directed towards a specific product such as a type of lamp, the user can draw the lamp and indicate the specific area of interest by creating an illustration of the component.

Figure 8:
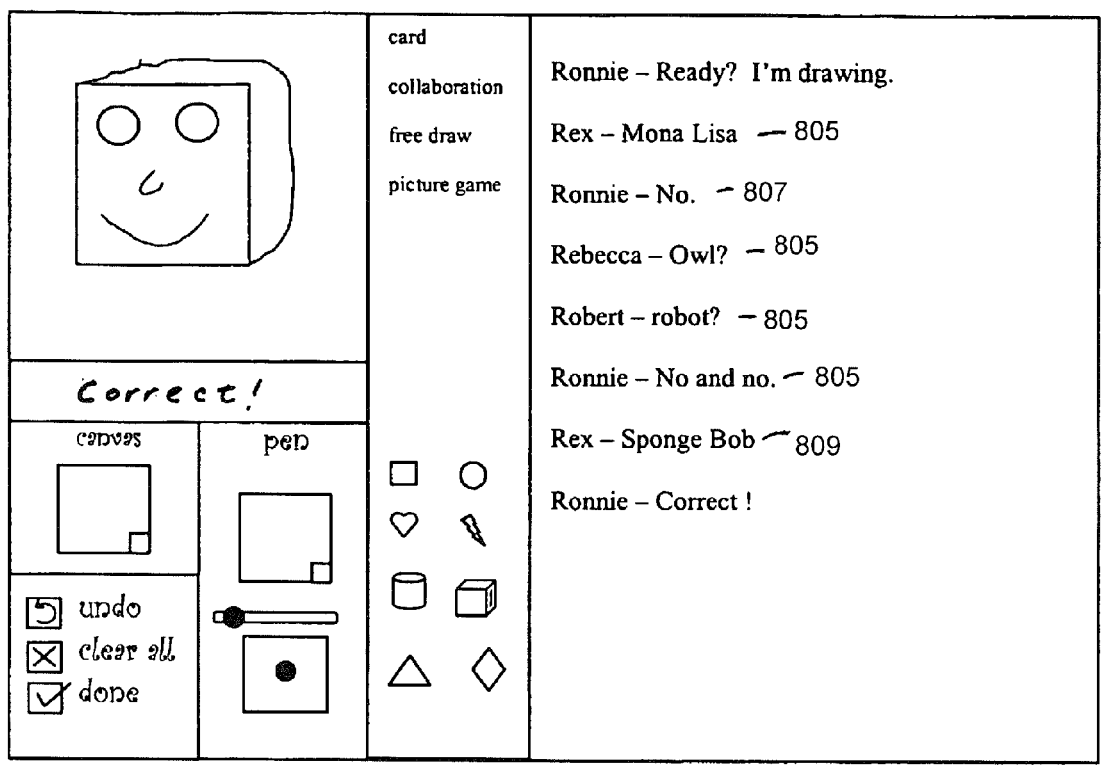
FIG. 8 illustrates the drawing tool used in a drawing game.

In addition to pure communications applications, the inventive drawing system can be used for other types of entertainment. For example a group of friends would be able to play a drawing game such as "Pictionary" using their networked computers. The system may allow a first user to start drawing and other users to observer the drawing in progress and input text (or voice communications) with guesses. Once the picture is correctly guessed the game is stopped and a new drawer is selected. With reference to FIG. 8, the picture guessing game starts with Ronnie as the drawer. Rex, Rebecca and Robert are able to observe the drawing being created and guess what is being drawn. As the drawing progresses, the players guess the object 805 and the system or the drawer can respond 807. In this example, Rex correctly guesses 809.

The system can have increased complexity by including features such as providing the words to be drawn and identifying winners of the game by matching the typed or spoken words to the provided word. The system may also give warnings to start drawing and not allow any marks to be made before the designed time. A timer may also be included for scoring purposes so that different players can be timed for the same drawing. The system may only allow a first user to start drawing at a designated time. The other users can watch the illustration being created and detect when a player has typed in the correct description of the drawing which stops the clock.

Figure 9:
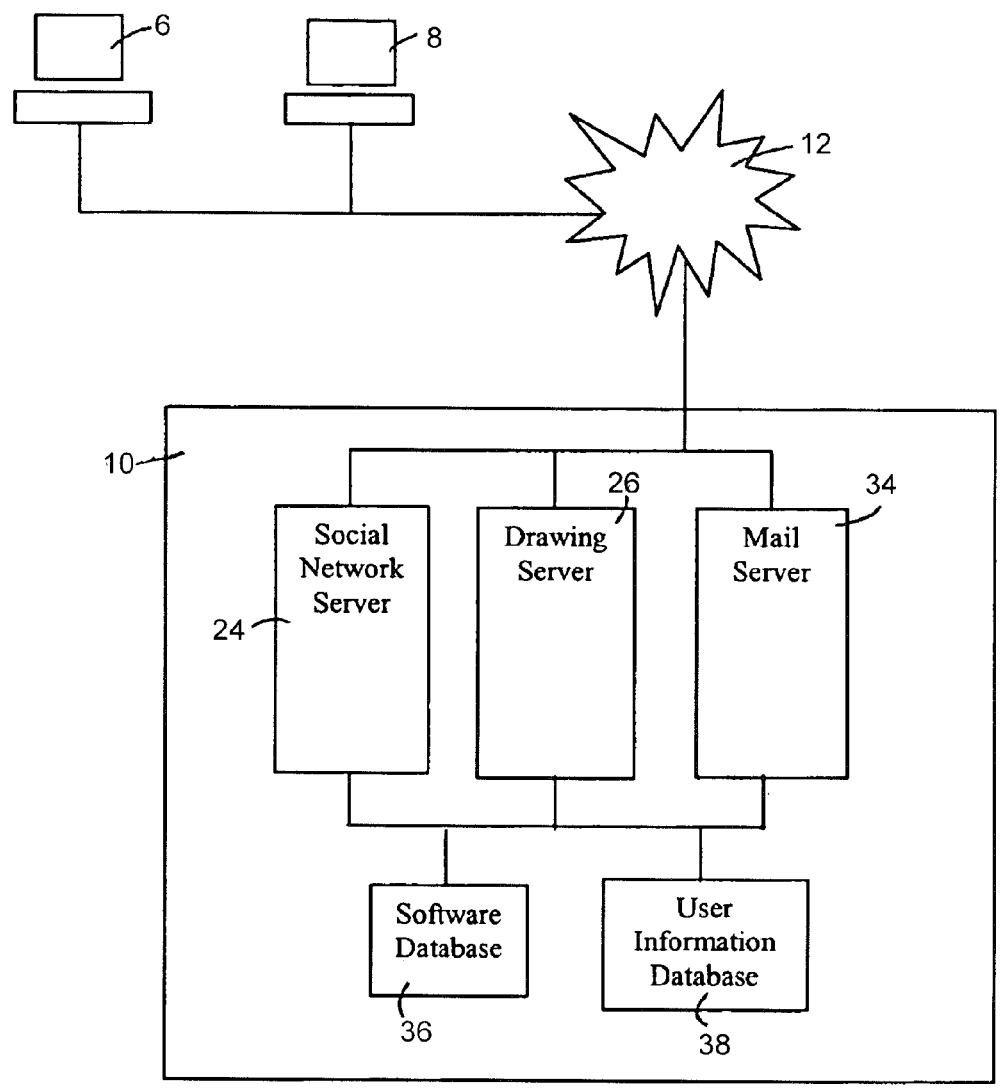
FIG. 9 illustrates an embodiment of the system architecture.

FIG. 9 illustrates the general architecture of an embodiment of the present invention. A plurality of graphical user interface (GUI) displays are presented on a plurality of computer devices 6, 8 connected to a social network apparatus 10 via the Internet 12. The computer device may be any device capable of presenting data, including, but not limited to, computers, cellular telephones, networked television sets, personal digital assistants, etc. The Internet refers to a collection of distinct networks working together. The networks are connected to each other using the Internet protocol (IP) and other similar protocols. The Internet provides file transfer, remote log in, electronic mail, news and other services. Although the description may refer to terms commonly used in describing particular public networks such as the Internet, the description and concepts equally apply to other public and private computer networks, including systems having architectures dissimilar to that shown in FIG. 9. For example and without limitation thereto, the system of the present invention can find application in public as well as private networks, such as closed systems, or private company networks.

The social network system 10 is connected to the Internet 12. As is well known in the art(s), routers forward packets between networks. The router 14 forwards information packets between the apparatus 10 and computer devices 6, 8 over the Internet 12. All of components of the social network system 10 may be connected and may communicate via a wide or local area network (WAN or LAN).

The social network system 10 includes an social network application server 24 comprise a web application server and a computer server that serves as the application layer of the present invention. Yet another server is the drawing server 26, which has the purpose of storing and providing drawing images to other components of the apparatus 10. Also included is a mail server 34, which sends and receives electronic messages to and from devices 6, 8. The servers are coupled to database software 36 and a database 38.

The Web application server 30 is a system that sends out Web pages in response to Hypertext Transfer Protocol (HTTP) requests from remote browsers (i.e. users of the social network system 10). That is, the Web server provides the graphical user interface to users of the system in the form of Web pages. These Web pages sent to the user's device 6, 8 would result in graphical user interface screens that include the communications system with integrated drawing tools. The application server 24, the database software 36 and a database 38 and the mail server 34 can be shielded from the public Internet 12 through the firewall. The firewall is a dedicated gateway machine with special security precaution software.

The servers 24, 26, 34 may include a central processing unit (CPU), a random access memory (RAM) temporary storage of information, and a read only memory (ROM) for permanent storage of information. The servers 24, 26, 34 may be generally controlled and coordinated by operating system software. The operating system controls allocation of system resources and performs tasks such as processing, scheduling, memory management, networking, and I/O services, among things. Thus, the operating system resident in system memory and executed by CPU coordinates the operation of the other elements of the social network system 10. Although the description of the computer server 32 may refer to terms commonly used in describing particular computer servers, the description and concepts equally apply to other processing systems, including systems having architectures dissimilar to that shown in FIG. 9.

The social network system 10 may also include a drawing server 26 that manage the illustrations created with the inventive drawing system. The drawing server 26 may be configured separately from the social network server 24. This configuration may increase the scalability of the social network system 10. Alternatively, the social network server 30 and the drawing server 26 can be configured together. Examples of image formats that can be managed by the drawing server 26 include, but are not limited to, Graphical Interchange Format ("GIF"), Joint Photographics Experts Group ("JPEG"), Tagged Image File ("TIF") or other similar formats.

The mail server 34 is a repository for e-mail messages received from the Internet 12. It also manages the transmission of electronic messages. The mail server 134 consists of a storage area, a set of user definable rules, a list of users and a series of communication modules. Its primary purpose in the present invention is the storage and distribution of e-mail messages to the Internet 12.

The databases 36, 38 store software, illustrations, descriptive data, digital images, system data and any other data item required by the other components of the apparatus. The databases may be provided, for example, as a database management system, and object-oriented database management system, a relational database management system (e.g. DB2, ACCESS etc.), a file system or another conventional database package. Thus, the databases 36, 38 can be implemented using object-oriented technology or via text files. Further, the databases 36, 38 can be accessed via a Structured Query Language (SQL) or other tools known to one of ordinary skill in the art. As used herein, descriptive data refers to information that describes a user or characteristics/interests of a user. For example, descriptive data may include the user's name and othe might include elements that describe attributes of the user, such as gender, marital status or occupation. The descriptive data may also include digital images such as photographs and original illustrations. In the present exemplary system, descriptive data is further grouped into "user data", location data, zip code data, profile data and illustrations.

In the foregoing, a social network drawing system has been described. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. A computer program product comprising a computer usable medium having a computer readable program code embodied therein, the computer readable program code adapted to be executed to implement a method for facilitating social network interaction among online users over a computer network using a web browser, the method comprising:

providing, by a server computer, a graphical user interface that is separately and simultaneously accessible by users of a plurality of client computers on the network, the graphical user interface having a drawing portion that includes a drawing tool for creating illustrations and a posting portion separated from the drawing portion for displaying the illustrations;

receiving, by the server computer, a first illustration from a user of a first client computer, the first illustration being created using the drawing tool;

posting, by the server computer on the posting portion of the graphical user interface, the first illustration next to an identification of the user of the first client computer;

receiving, by the server computer, a second illustration from a user of a second client computer, the second illustration being created using the drawing tool; and posting, by the server computer on the posting portion of the graphical user interface adjacent to the first illustration, the second illustration next to an identification of the user of the second client computer.

2. The computer program product of claim 1 wherein the drawing tool includes a marker tool for drawing lines on the drawing portion.

3. The computer program product of claim 2 wherein the drawing tool includes a marker size tool for adjusting widths of the lines with the marker tool.

4. The computer program product of claim 2 wherein the drawing tool includes an eraser tool for removing a part of the lines drawn with the marker tool.

5. The computer program product of claim 2 wherein the drawing tool includes a color tool for changing a color of the line drawn with the marker tool.

6. The computer program product of claim 1 wherein the graphical user interface includes a first reply button associated with the first illustration for posting a first reply to the first illustration in the posting portion adjacent to the first illustration.

7. The computer program product of claim 6 wherein the reply button is used for posting a second reply to the first illustration in the posting portion adjacent to the second illustration.

8. The computer program product of claim 1 wherein the drawing tool includes a first reply button that is used to post a first text message in an area associated with the first drawing.

9. The computer program product of claim 8 wherein the drawing tool includes a second reply button that is used to post a second text message in an area associated with the second drawing.

10. The computer program product of claim 1 wherein the server includes a blocking system that detects predefined shapes and if the blocking system detects any of the predefined shapes the illustration containing the predefined shape is blocked from being posted.

11. A method for facilitating social network interaction among online users over a computer network using a web browser, the method comprising:

providing, by a server computer, a graphical user interface that is separately and simultaneously accessible by users of a plurality of client computers on the network, the graphical user interface having a drawing portion that includes a drawing tool for creating illustrations and a posting portion separated from the drawing portion for displaying the illustrations;

receiving, by the server computer, a first illustration from a user of a first client computer, the first illustration being created using the drawing tool;

posting, by the server computer on the posting portion of the graphical user interface, the first illustration next to an identification of the user of the first client computer;

receiving, by the server computer, a second illustration from a second client computer, the second illustration being created using the drawing tool; and posting, by the server computer on the posting portion of the graphical user interface adjacent to the first illustration, the second illustration next to an identification of the user of the second client computer.

12. The method of claim 11 wherein the drawing tool is a marker tool for drawing lines on the drawing portion.

13. The method of claim 12 wherein the drawing tool includes a marker size tool for adjusting the width of lines drawing with the marker tool.

14. The method of claim 12 wherein the drawing tool includes an eraser tool for removing the lines drawn with the marker tool.

15. The method of claim 12 wherein the drawing tool includes a color tool for changing a color of the line drawn with the marker tool.

16. The method of claim 11 wherein the graphical user interface includes a first reply button associated with the first illustration for posting a first reply to the first illustration in the posting portion adjacent to the first illustration.

17. The method of claim 16 wherein the reply button is used for posting a second reply to the first illustration in the posting portion adjacent to the second illustration.

18. The method of claim 11 wherein the drawing tool includes a first reply button that is used to post a first text message in an area associated with the first drawing.

19. The method of claim 18 wherein the drawing tool includes a second reply button that is used to post a second text message in an area associated with the second drawing.

20. The method of claim 11 wherein the server includes a blocking system that detects predefined shapes and if the blocking system detects any of the predefined shapes the illustration containing the predefined shape is blocked from being posted.

* * * * *